No. 3,275,512
PROCESS FOR TREATING INFLAMMATION WITH BIPHENYLCARBAMATES
Alan J. Lemin, Richland Township, Kalamazoo County, Mich., assignor to The Upjohn Company, Kalamazoo, Mich., a corporation of Delaware
No Drawing. Continuation of application Ser. No. 166,358, Jan. 15, 1962. This application Nov. 27, 1962, Ser. No. 240,417
2 Claims. (Cl. 167—65)

This invention relates to a new and useful process for treating inflammation. More particularly this invention relates to a process for treating inflammation comprising the administration of a 4-phenylphenyl carbamate in association with a pharmaceutical carrier.

This application is a continuation of application S.N. 166,358, filed January 15, 1962, now abandoned.

The therapeutic compounds of the present invention are represented by the following structural formula:

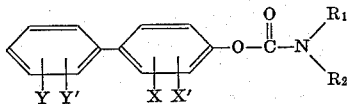

Formula I wherein $R_1$, taken individually, represents a member selected from the group consisting of hydrogen, alkyl of from 1 to 4 carbon atoms, inclusive, and alkenyl of from 3 to 4 carbon atoms, inclusive; $R_2$, taken individually, represents a member selected from the group consisting of alkyl of from 1 to 4 carbon atoms, inclusive, and alkenyl of from 3 to 4 carbon atoms, inclusive; and $R_1$ and $R_2$ taken together with —N< represent a saturated heterocyclic amino radical

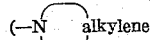

containing one nitrogen atom and from 4 to 8 carbon atoms, inclusive, and having from 5 to 9 nuclear atoms, inclusive.

X, X′, Y and Y′ are members selected from the group consisting of hydrogen, halogen, alkyl of from 1 to 4 carbon atoms, inclusive, and alkoxy of from 1 to 4 carbon atoms, inclusive.

Representative groups within the scope of the present invention include: alkyl, e.g., methyl, ethyl, propyl, isopropyl, butyl, and isobutyl; alkenyl, e.g., allyl, methallyl, and crotyl; halogen, e.g., fluoro, chloro, bromo, and iodo; and alkylene, e.g., tetramethylene, pentamethylene, hexamethylene, heptamethylene, octamethylene, 1,1-dimethyltetramethylene, 1-methylpentamethylene, 2-methylpentamethylene, 3-methylpentamethylene, 1,5-dimethylpentamethylene, 1-isopropyltetramethylene, and 2,5-dimethylhexamethylene; and alkoxy, e.g., methoxy, ethoxy, propoxy, and butoxy.

The starting material for the preparation of the compounds of the present invention is a phenol of the formula:

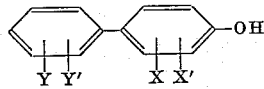

Formula II wherein X, X′, Y and Y′ are as hereinbefore defined.

Compounds of the present invention of Formula I wherein $R_1$ is hydrogen (i.e., monoalkyl- and monoalkenylcarbamates) are readily prepared by condensing a phenol of the Formula II with an alkyl or alkenyl isocyanate, for example, methyl, ethyl, propyl, isopropyl, butyl, isobutyl, allyl, and crotyl isocyanate, in the presence of an inert organic solvent, for example, diethyl ether, diisopropyl ether, dioxane, and the like. The reactants are preferably mixed in equimolar proportions, but, if desired, an excess of either reactant can be used. The reaction proceeds at temperatures between about 15° C. and about 100° C. and can be accelerated by adding a small amount of a base such as triethylamine. Illustratively, the carbamates are readily obtained by allowing the reaction mixture to stand overnight at about 25° C. The product is recovered by conventional means such as filtration, or concentration of the reaction mixture followed by filtration, washing, and recrystallization.

The compounds of Formula I are also prepared by reacting a compound of the Formula II, preferably in the form of an alkali metal salt, e.g., sodium or potassium salt, with phosgene to form the corresponding chloroformate, and then reacting the chloroformate with a monoalkylamine, monoalkenylamine, dialkylamine, dialkenylamine, alkylalkenylamine or a saturated heterocyclic amine of the formula

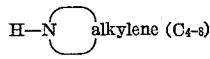

The chloroformate is prepared by mixing a compound of the Formula II, an aqueous solution of a base, for example, sodium or potassium hydroxide, and a solution of phosgene in an inert organic solvent, for example, toluene, benzene, diethyl ether, and the like. This reaction is exothermic and is advantageously carried out at temperatures between about −30° C. and about +30° C. The phosgene:organic solvent solution is added slowly and with mixing to prevent localized heating or undesirable temperature above 30° C. The chloroformate, thus formed, accumulates in the organic phase and the aqueous phase is separated. The chloroformate can be isolated and purified by recrystallization or distillation, or it can be used without further purification in the preparation of the carbamates of the present invention.

The reaction of an amine of the kind noted above and the chloroformate is carried out in the presence of a solvent, for example, water, diethyl ether, and dioxane. The reaction is advantageously carried out at temperatures in the range of about 10° C. to about 50° C. The rate of reaction is slow at temperatures below about 10° C.; and at temperatures above about 50° C., the amine can volatilize and decomposition of the chloroformate intermediate or carbamate product can occur. Stoichiometrically, the reaction requires one mole of amine for each mole of chloroformate. However, the reaction produces one mole of hydrogen chloride, so an excess of the amine, preferably about at least one mole excess, or another suitable acid acceptor, for example, triethylamine, pyridine, picoline, sodium hydroxide, and the like should be employed. The carbamate product of the Formula I is recovered by conventional methods, for example, filtering off any solids, removing the solvent, washing and recrystallization from a suitable solvent.

Alternatively, the compound of the Formula I can be prepared by reacting a carbamyl halide, for example, dimethylcarbamyl chloride, propylcarbamyl chloride, and the like, with a phenol having Formula II above.

The following examples are illustrative of the preparation of the active compounds of the present invention but are not to be construed as limiting.

EXAMPLE 1

4-phenylphenyl methylcarbamate

Thirty-four grams (0.2 mole) of 4-phenylphenol, 11.4 grams (0.2 mole) of methyl isocyanate, 3 drops of triethylamine, and 21 ml. of toluene were dissolved in 100 ml. of diethyl ether. The solution was allowed to stand overnight at 25° C. The solvents were removed by distillation under reduced pressure to leave crystals of 4-phenylphenyl methylcarbamate. The crystals were washed with 60 ml. of technical hexane (essentially a mixture of methyl-substituted pentanes and n-hexane having a boiling range of 60 to 68° C.) and dried to provide 30 grams of crystalline 4-phenylphenyl methylcarbamate melting at 117–124° C.

*Analysis.*—Calcd. for $C_{14}H_{13}NO_2$: C, 73.99; H, 5.77; N, 6.16. Found: C, 74.15; H, 6.24; N, 6.16.

EXAMPLE 2

*2-bromo-4-(4-bromophenyl)phenyl ethylcarbamate*

Following the procedure of Example 1, but substituting 0.1 mole of 2-bromo-4-(4-bromophenyl)phenol for 4-phenylphenol and 0.1 mole of ethyl isocyanate for methyl isocyanate, 2-bromo-4-(4-bromophenyl)phenyl ethylcarbamate is obtained.

EXAMPLE 3

*4-(4-bromophenyl)phenyl ethylcarbamate*

Following the procedure of Example 1, but substituting 0.1 mole of 4-(4-bromophenyl)phenol for 4-phenylphenol and 0.1 mole of ethyl isocyanate for methyl isocyanate, 4-(4-bromophenyl)phenyl ethylcarbamate is obtained.

EXAMPLE 4

*2-chloro-4-phenylphenyl propylcarbamate*

Following the procedure of Example 1, but substituting 0.1 mole of 3-chloro-4-phenylphenol for 4-phenylphenol and 0.1 mole of propyl isocyanate for methyl isocyanate, 2-chloro-4-phenylphenyl propylcarbamate is obtained.

EXAMPLE 5

*2-chloro-4-(4-chlorophenyl)phenyl isopropylcarbamate*

Following the procedure of Example 1, but substituting 0.1 mole of 2-chloro-4-(4-chlorophenyl)phenol for 4-phenylphenol and 0.1 mole of isopropyl isocyanate for methyl isocyanate, 2-chloro-4-(4-chlorophenyl)phenyl isopropylcarbamate is obtained.

EXAMPLE 6

*2,6-dichloro-4-phenylphenyl isopropylcarbamate*

Following the procedure of Example 1, but substituting 0.1 mole of 2,6-dichloro-4-phenylphenol for 4-phenylphenol and 0.1 mole of isopropyl isocyanate for methyl isocyanate, 2,6-dichloro-4-phenylphenyl isopropylcarbamate is obtained.

EXAMPLE 7

*2,6-dichloro-4-(4-chlorophenyl)phenyl butylcarbamate*

Following the procedure of Example 1, but substituting 0.1 mole of 2,6-dichloro-4-(4-chlorophenyl)phenol for 4-phenylphenol and 0.1 mole of butyl isocyanate for methyl isocyanate, 2,6-dichloro-4-(4-chlorophenyl)phenyl butylcarbamate is obtained.

EXAMPLE 8

*4-(2-methylphenyl)phenyl isobutylcarbamate*

Following the procedure of Example 1, but substituting 0.1 mole of 4-(2-methylphenyl)phenol for 4-phenylphenol and 0.1 mole of isobutyl isocyanate for methyl isocyanate, 4-(2-methylphenyl)phenyl isobutylcarbamate is obtained.

EXAMPLE 9

*3-methyl-4-(2-methylphenyl)phenyl allylcarbamate*

Following the procedure of Example 1, but substituting 0.1 mole of 3-methyl-4-(2-methylphenyl)phenol for 4-phenylphenol and 0.1 mole of allyl isocyanate for methyl isocyanate, 3-methyl-4-(2-methylphenyl)phenyl allylcarbamate is obtained.

EXAMPLE 10

*2-isopropyl-4-phenylphenyl crotylcarbamate*

Following the procedure of Example 1, but substituting 0.1 mole of 2-isopropyl-4-phenylphenol for 4-phenylphenol and 0.1 mole of crotyl isocyanate for methyl isocyanate, 2-isopropyl-4-phenylphenyl crotylcarbamate is obtained.

EXAMPLE 11

*2-isopropyl-4-phenylphenyl dimethylcarbamate*

A. 2-ISOPROPYL-4-PHENYLPHENYL CHLOROFORMATE 42.4 grams (0.2 mole) of 2-isopropyl-4-phenylphenol and 8.0 grams (0.2 mole) of sodium hydroxide are added to 150 ml. of water. To this aqueous solution is added a solution of 19.8 grams (0.2 mole) of phosgene in 120 ml. of toluene, prepared by bubbling phosgene into toluene at −10° C. The phosgene:toluene solution is added slowly with mechanical stirring while maintaining the temperature below 25° C. The reaction mixture is stirred for 1.5 hours and filtered to remove solids. The aqueous layer is separated from the organic layer in a separatory funnel and the organic layer washed with 200-ml. portions of 5% aqueous potassium hydroxide solution. The toluene solution is washed with water until neutral and then dried over anhydrous sodium sulfate. The toluene is removed by distillation to leave 2-isopropyl-4-phenylphenyl chloroformate as a residue.

B. 2-ISOPROPYL-4-PHENYLPHENYL DIMETHYLCARBAMATE

To a solution of 27.4 grams (0.1 mole) of 2-isopropyl-4-phenylphenyl chloroformate in 200 ml. of anhydrous diethyl ether is added 9.0 grams (0.2 mole) of dimethylamine dissolved in 100 ml. of anhydrous ether. The reaction flask is stirred during the addition to prevent localized heating. The reaction mixture is allowed to stand overnight during which time a precipitate forms. The precipitate is removed by filtration and the ether by means of distillation under reduced pressure to provide 2-isopropyl-4-phenylphenyl dimethylcarbamate.

EXAMPLE 12

*4-(4-methoxyphenyl)phenyl diethylcarbamate*

Following the procedure of Example 11, Part A, substituting 0.2 mole of 4-(4-methoxyphenyl)phenol for 2-isopropyl-4-phenylphenol, the respective chloroformate is obtained. Following the procedure of Part B, commencing with 0.1 mole of 4-(4-methoxyphenyl)phenyl chloroformate and substituting 0.2 mole of diethylamine, 4-(4-methoxyphenyl)phenyl diethylcarbamate is obtained.

EXAMPLE 13

*4-(2,5-dimethoxyphenyl)phenyl methylallylcarbamate*

Following the procedure of Example 11, Part A, substituting 0.2 mole of 4-(2,5-dimethoxyphenyl)phenol for 2-isopropyl-4-phenylphenol, the respective chloroformate is obtained. Following the procedure of Part B, commencing with 0.1 mole of 4-(2,5-dimethoxyphenyl)phenyl chloroformate and substituting 0.2 mole of methylallylamine, 4-(2,5-dimethoxyphenyl)phenyl methylallylcarbamate is obtained.

EXAMPLE 14

*3-methyl-4-(2-methyl-4-methoxyphenyl)phenyl methylethylcarbamate*

Following the procedure of Example 11, Part A, substituting 0.2 mole of 3-methyl-4-(2-methyl-4-methoxyphenyl)phenol for 2-isopropyl-4-phenylphenol, the respective chloroformate is obtained. Following the procedure of Part B, commencing with 0.1 mole of 3-methyl-4-(2-methyl-4-methoxyphenyl)phenyl chloroformate and substituting 0.2 mole of methylethylamine, 3-methyl-4-(2-methyl-4-methoxyphenyl)phenyl methylethylcarbamate is obtained.

EXAMPLE 15

*3-methyl-4-(2-methyl-4-methoxyphenyl)phenyl dicrotylcarbamate*

Following the procedure of Example 11, Part A, substituting 0.2 mole of 3-methyl-4-(2-methyl-4-methoxyphenyl)phenol for 2-isopropyl-4-phenylphenol, the respective chloroformate is obtained. Following the procedure of Part B, commencing with 0.1 mole of 3-methyl-4-(2-methyl-4-methoxyphenyl)phenyl chloroformate and substituting 0.2 mole of dicrotylamine, 3-methyl-4-(2-methyl-4-methoxyphenyl)phenyl dicrotylcarbamate is obtained.

EXAMPLE 16

*3-methyl-4-(3-methylphenyl)phenyl tetramethylene carbamate*

Following the procedure of Example 11, Part A, substituting 0.2 mole of 3-methyl-4-(3-methylphenyl)phenol for 2-isopropyl-4-phenylphenol, the respective chloroformate is obtained. Following the procedure of Part B, commencing with 0.1 mole of 3-methyl-4-(3-methylphenyl)phenyl chloroformate and substituting 0.2 mole of pyrrolidine, 3-methyl-4-(3-methylphenyl)phenyl tetramethylenecarbamate is obtained.

EXAMPLE 17

*3-methyl-4-(4-methylphenyl)phenyl pentamethylene carbamate*

Following the procedure of Example 11, Part A, substituting 0.2 mole of 3-methyl-4-(4-methylphenyl)phenol for 2-isopropyl-4-phenylphenol, the respective chloroformate is obtained. Following the procedure of Part B, commencing with 0.1 mole of 3-methyl-4-(4-methylphenyl)phenyl chloroformate and substituting 0.2 mole of piperidine, 3-methyl-4-(4-methylphenyl)phenyl pentamethylenecarbamate is obtained.

EXAMPLE 18

*2-chloro-4-phenyl-6-isopropylphenyl hexamethylenecarbamate*

Following the procedure of Example 11, Part A, substituting 0.2 mole of 2-chloro-4-phenyl-6-isopropylphenol for 2-isopropyl-4-phenylphenol, the respective chloroformate is obtained. Following the procedure of Part B, commencing with 0.1 mole of 2-chloro-4-phenyl-6-isopropylphenyl chloroformate and substituting 0.2 mole of hexamethylenimine, 2-chloro-4-phenyl-6-isopropylphenyl hexamethylenecarbamate is obtained.

EXAMPLE 19

*2-chloro-4-phenyl-6-isopropylphenyl heptamethylenecarbamate*

Following the procedure of Example 11, Part A, substituting 0.2 mole of 2-chloro-4-phenyl-6-isopropylphenol for 2-isopropyl-4-phenylphenol, the respective chloroformate is obtained. Following the procedure of Part B, commencing with 0.1 mole of 2-chloro-4-phenyl-6-isopropylphenyl chloroformate and substituting 0.2 mole of heptamethylenimine, 2-chloro-4-phenyl-6-isopropylphenyl heptamethylenecarbamate is obtained.

EXAMPLE 20

*2-methyl-4-(2,3-dimethoxyphenyl)phenyl octamethylene-carbamate*

Following the procedure of Example 11, Part A, substituting 0.2 mole of 2-methyl-4-(2,3-dimethoxyphenyl)phenol for 2-isopropyl-4-phenylphenol, the respective chloroformate is obtained. Following the procedure of Part B, commencing with 0.1 mole of 2-methyl-4-(2,3-dimethoxyphenyl)phenyl chloroformate and substituting 0.2 mole of octamethylenimine, 2-methyl-4-(2,3-dimethoxyphenyl)phenyl octamethylene-carbamate is obtained.

EXAMPLE 21

*4-(2-methoxyphenyl)phenyl (1,1-dimethyltetramethylene)-carbamate*

Following the procedure of Example 11, Part A, substituting 0.2 mole of 4-(2-methoxyphenyl)phenol for 2-isopropyl-4-phenylphenol, the respective chloroformate is obtained. Following the procedure of Part B, commencing with 0.1 mole of 4-(2-methoxyphenyl)phenyl chloroformate and substituting 0.2 mole of 2,2-dimethylpyrrolidine, 4-(2-methoxyphenyl)phenyl (1,1-dimethyltetramethylene)carbamate is obtained.

EXAMPLE 22

*4-(4-ethoxyphenyl)phenyl (1-methylpentamethylene)-carbamate*

Following the procedure of Example 11, Part A, substituting 0.2 mole of 4-(4-ethoxyphenyl)phenol for 2-isopropyl-4-phenylphenol, the respective chloroformate is obtained. Following the procedure of Part B, commencing with 0.1 mole of 4-(4-ethoxyphenyl)phenyl chloroformate and substituting 0.2 mole of 2-methylpiperidine, 4-(4-ethoxyphenyl)phenyl (1-methylpentamethylene)carbamate is obtained.

EXAMPLE 23

*3-methyl-4-(4-methylphenyl)phenyl (2-methylpentamethylene)-carbamate*

Following the procedure of Example 11, Part A, substituting 0.2 mole of 3-methyl-4-(4-methylphenyl)phenol for 2-isopropyl-4-phenylphenol, the respective chloroformate is obtained. Following the procedure of Part B, commencing with 0.1 mole of 3-methyl-4-(4-methylphenyl)phenyl chloroformate and substituting 0.2 mole of 3-methylpiperidine, 3-methyl-4-(4-methylphenyl)phenyl (2-methylpentamethylene)carbamate is obtained.

EXAMPLE 24

*4-phenylphenyl (3-methylpentamethylene)carbamate*

Following the procedure of Example 11, Part A, substituting 0.2 mole of 4-phenylphenol for 2-isopropyl-4-phenylphenol, the respective chloroformate is obtained. Following the procedure of Part B, commencing with 0.1 mole of 4-phenylphenyl chloroformate and substituting 0.2 mole of 4-methylpiperidine, 4-phenylphenyl (3-methylpentamethylene)carbamate is obtained.

EXAMPLE 25

*4-(2-fluorophenyl)phenyl (1,5-dimethylpentamethylene) carbamate*

Following the procedure of Example 11, Part A, substituting 0.2 mole of 4-(2-fluorophenyl)phenol for 2-isopropyl-4-phenylphenol, the respective chloroformate is obtained. Following the procedure of Part B, commencing with 0.1 mole of 4-(2-fluorophenyl)phenyl chloroformate and substituting 0.2 mole of 2,6-dimethylpiperidine, 4-(2-fluorophenyl)phenyl (1,5-dimethylpentamethylene)carbamate is obtained.

EXAMPLE 26

*2,6-dichloro-4-phenylphenyl (1-isopropyltetramethylene) carbamate*

Following the procedure of Example 11, Part A, substituting 0.2 mole of 2,6-dichloro-4-phenylphenol for 2-isopropyl-4-phenylphenol, the respective chloroformate is obtained. Following the procedure of Part B, commencing with 0.1 mole of 2,6-dichloro-4-phenylphenyl chloroformate and substituting 0.2 mole of 2-isopropylpyrrolidine, 2,6-dichloro-4-phenylphenyl (1-isopropyltetramethylene)carbamate is obtained.

EXAMPLE 27

*2-chloro-4-phenylphenyl (2,5-dimethylhexamethylene) carbamate*

Following the procedure of Example 11, Part A, substituting 0.2 mole of 2-chloro-4-phenylphenol for 2-isopropyl-4-phenylphenol, the respective chloroformate is obtained. Following the procedure of Part B, commencing with 0.1 mole of 2-chloro-4-phenylphenyl chloroformate and substituting 0.2 mole of 3,6-dimethylhexamethylenimine, 2-chloro-4-phenylphenyl (2,5-dimethylhexamethylene)carbamate is obtained.

The compounds of the invention have demonstrated anti-inflammatory activity as shown by the granuloma pouch technique in rats.

The compounds of the invention are useful as insecticides for the control of insect pests, for example, mosquito larvae. The compounds can be used per se for this purpose or in association with an agricultural carrier of the kind commonly used in the art.

The compounds of the present invention are useful in the preparation of a variety of pharmaceutical compositions. Preferably the compositions are prepared in unit dosage form, i.e., each unit containing a predetermined amount of the therapeutic compound of the present invention, for oral, parenteral and topical administration. For oral administration the compositions can take the form of tablets, capsules, boluses, pills, granules, feeds, syrups, elixirs, and the like. Topical administration can be in the form of ointments, creams, solutions, suspensions, sprays, and powders. For parenteral administration sterile solutions and suspensions can be prepared in vehicles containing water, ethanol, glycerol, propylene glycol, polyalkylene glycols, vegetable oils, and the like.

The compostions, in the appropriate form, can be administered orally and parenterally for systemic treatment, applied topically for local treatment, or administered parenterally for local treatment such as injection into the joint cavity, tendon sheath, and bursa.

The compositions provide the veterinarian with a method for treating inflammation in large and small animals as well as birds and poultry. The animals and birds can be commercial animals raised for profit as well as animals kept for pets or research. Inflammatory conditions which can be treated include, but are not limited to, enteritis, irritis, retained placenta, laminitis, rheumatoid and traumatic arthritis, osteoarthritis, periostitis, tendonitis, tenosynovitis, bursitis, and myositis.

The dosage of the compounds of the present invention depends upon the particular subject treated and the subject's age, weight and condition, as well as the particular condition being treated, its severity and route of administration. In general a dose of 3 mg. to 45 mg. per kg. of body weight given daily in single or divided doses, or 250 to 3000 mg. per day, embraces the effective therapeutic dosage for most conditions for which the said compounds are effective.

Advantageously the compounds of the present invention do not have the undersirable side-effects encountered with steroid and other types of anti-inflammatory agents. For example, there is no marked water, sodium or potassium retention nor is there the development of gastric ulceration or other distress.

The following examples illustrate the preparation of pharmaceutical dosage forms but are not to be considered as limiting.

Example 28

One thousand scored tablets for oral administration, each containing 500 mg. of 4-phenylphenyl methylcarbamate are prepared from the following types and amounts of ingredients:

| | Gm. |
|---|---|
| 4-phenylphenyl methylcarbamate | 500 |
| Lactose | 150 |
| Corn starch | 65 |
| Magnesium stearate | 25 |
| Light liquid petrolatum | 3 |

The ingredients are thoroughly mixed and slugged. The slugs are broken down by forcing through a screen and the resulting granules are then compressed into tablets, each tablet containing 0.5 gm. of 4-phenylphenyl methylcarbamate.

Following the above formulation, 100 boluses for large animal use are similarly prepared, by enlarging the tablet size ten times, each bolus containing 5000 mg. of 4-phenylphenyl methylcarbamate.

Example 29

One thousand cc. of a sterile aqueous suspension for parenteral administration and containing 250 mg. of 4-phenylphenyl methylcarbamate per cc. is prepared from the following types and amounts of ingredients:

| | Gm. |
|---|---|
| 4-phenylphenyl methylcarbamate | 250 |
| Polyethylene glycol 4000, U.S.P. | 30 |
| Porcaine hydrochloride | 20 |
| Myristyl gamma picolinium chloride | 0.2 |
| Water for injection, q.s. 1000 cc. | |

Example 30

One thousand cc. of an aqueous syrup suspension for oral administration containing 500 mg. of 4-phenylphenyl methylcarbamate in each 5 cc. dose is prepared from the following types and amounts of ingredients:

| | | |
|---|---|---|
| 4-phenylphenyl methylcarbamate | gm | 100 |
| Citric acid | gm | 2 |
| Benzoic acid | gm | 1 |
| Sucrose | gm | 700 |
| Tragacanth | gm | 5 |
| Lemon oil | cc | 2 |
| Deionized water, q.s. | cc | 1000 |

The citric acid, benzoic acid, sucrose, tragacanth, and lemon oil are dispersed in sufficient water to make 850 cc. of solution. The carbamate, finely divided, is stirred into the syrup until uniformly distributed. Sufficient water is added to make 1000 cc.

The syrup can be administered to small animals, 60 to 100 lb., at a teaspoonful dosage. For large animals such as a horse, one to two ounces of the composition can be diluted with milk or water to make 12 ounces administered as a drench.

Example 31

500 lb. of a composition for feeding turkeys with enteritis are prepared from the following types and amounts of ingredients:

| | | |
|---|---|---|
| 4-phenylphenyl methylcarbamate | gm | 75 |
| Ground oats | lb | 30 |
| Meat and bone scraps 50%* | lb | 30 |
| Fish meal 60%* | lb | 20 |
| Alfalfa meal, dehydrated 17%* | lb | 30 |
| Ground corn | lb | 158 |
| Wheat bran | lb | 15 |
| Wheat std. midds. | lb | 30 |
| Soybean oil meal 50%* | lb | 150 |
| Dicalcium phosphate | lb | 9.5 |
| Calcium carbonate | lb | 14 |
| Trace mineralized salt | lb | 2.5 |
| Yellow fat | lb | 10 |
| Vitamin D premix | lb | 0.3 |
| B-vitamin supplement | lb | 0.45 |
| Trace mineral premix | lb | 0.3 |

*The percentages refer to the percent of protein present.

Example 32

Following the procedure of the preceding Examples 28 to 31, inclusive, compositions are similarly prepared substituting an equal amount of a compound prepared according to Examples 2 to 27, inclusive, for the 4-phenylphenyl methylcarbamate shown.

What is claimed is:

1. A process for the treatment of inflammation comprising the administration of 4-phenylphenyl methylcarbamate in association with a pharmaceutical carrier to and animal subject having inflammation of from about 3 mg. to about 45 mg. of 4-phenylphenyl methylcarbamate per kilogram of body weight of said subject.

2. A process for the treatment of inflammation comprising the administration, in unit dosage form, of from about 250 mg. to about 3000 mg. of 4-phenylphenyl methylcarbamate in association with a pharmaceutical carrier to an animal subject having inflammation.

References Cited by the Examiner

UNITED STATES PATENTS 1,252,452 1/1918 Kropp _____ 260—479
2,955,070 10/1960 Jones et al. _____ 167—30

OTHER REFERENCES

Kolbezen et al., J. Agricultural and Food Chem., vol. 2, pp. 864–70 (1954).

JULIAN S. LEVITT, *Primary Examiner.*

FRANK CACCIAPAGLIA, JR., *Examiner.*

LEROY B. RANDALL, *Assistant Examiner.*